United States Patent
Kramer et al.

(10) Patent No.: US 9,115,785 B1
(45) Date of Patent: Aug. 25, 2015

(54) COMPACT DRIVE MECHANISM WITH SELECTIVE REVERSE POWER OUTPUT

(71) Applicants: Radu Kramer, Woodcliff Lake, NJ (US); William X. Desmond, Westwood, NJ (US); David E. Parker, Clemmons, NC (US)

(72) Inventors: Radu Kramer, Woodcliff Lake, NJ (US); William X. Desmond, Westwood, NJ (US); David E. Parker, Clemmons, NC (US)

( * ) Notice: Subject to any disclaimer, the term of this patent is extended or adjusted under 35 U.S.C. 154(b) by 478 days.

(21) Appl. No.: 13/686,510

(22) Filed: Nov. 27, 2012

(51) Int. Cl.
*F16H 37/06* (2006.01)
*F16H 3/02* (2006.01)

(52) U.S. Cl.
CPC ........................................ *F16H 3/02* (2013.01)

(58) Field of Classification Search
CPC ............ B62M 3/00; B62M 5/00; B62M 1/38; B62M 1/30
USPC ........ 74/650, 665 A; 280/236, 237, 259, 251, 280/252, 253; 475/230, 220, 322
See application file for complete search history.

(56) References Cited

U.S. PATENT DOCUMENTS

| | | | |
|---|---|---|---|
| 457,290 A | 8/1891 | Phillips | |
| 584,200 A | 6/1897 | Wheatley | |
| 600,450 A | 3/1898 | Richmond et al. | |
| 608,674 A | 8/1898 | Harshner | |
| 651,676 A | 6/1900 | Storey | |
| 689,303 A | 12/1901 | Hall | |
| 2,391,809 A | 12/1945 | Wasem | |
| 2,424,639 A | 7/1947 | Sobirai | |
| 3,505,912 A * | 4/1970 | Miller | 475/8 |
| 3,779,099 A | 12/1973 | Trammell, Jr. | |
| 4,118,996 A * | 10/1978 | Eichinger | 74/404 |
| 4,178,807 A | 12/1979 | Young | |
| 4,456,276 A | 6/1984 | Bortolin | |
| 4,467,668 A | 8/1984 | Tatch | |
| 4,473,236 A | 9/1984 | Stroud | |
| 4,564,206 A | 1/1986 | Lenhardt | |
| 4,574,649 A | 3/1986 | Seol | |
| 4,606,695 A * | 8/1986 | Lenz | 414/735 |
| 5,059,160 A * | 10/1991 | Raniero | 475/234 |
| 5,236,211 A | 8/1993 | Meguerditchian | |
| 5,242,182 A | 9/1993 | Bezerra et al. | |
| 5,335,927 A | 8/1994 | Islas | |
| 5,351,575 A | 10/1994 | Overby | |
| 5,419,572 A | 5/1995 | Stiller et al. | |
| 5,595,214 A * | 1/1997 | Shaffer et al. | 137/517 |

(Continued)

FOREIGN PATENT DOCUMENTS

| | | | |
|---|---|---|---|
| FR | 2726532 A1 | 5/1996 | |
| GB | 2219261 A | 12/1989 | |

*Primary Examiner* — William Kelleher
*Assistant Examiner* — Zakaria Elahmadi
(74) *Attorney, Agent, or Firm* — Arthur Jacob

(57) ABSTRACT

A drive mechanism effects a rotary power output in a selected one of opposite first and second power output directions in response to a reciprocating power input resulting from substantially linear forces applied to the drive mechanism. The drive mechanism includes input bevel gears meshed with corresponding output bevel gears coupled to a common power output shaft through clutches that effect a rotary power output at the power output shaft in response to the reciprocating power input from the substantially linear forces. Opposite crank arms are coupled with the input bevel gears such that each crank arm is advanced by an applied substantially linear force, and is retracted upon advancement of the opposite crank arm. A selector enables selection of either one of the opposite directions of rotation of the power output shaft, without requiring a change in the manner in which the linear force input is applied.

17 Claims, 9 Drawing Sheets

(56) References Cited

U.S. PATENT DOCUMENTS

| | | | |
|---|---|---|---|
| 5,884,927 A * | 3/1999 | Mahaney et al. | 280/237 |
| 5,938,556 A * | 8/1999 | Lowell | 475/89 |
| 6,168,545 B1 * | 1/2001 | Lowell | 475/231 |
| 6,199,884 B1 * | 3/2001 | Doroftei | 280/252 |
| 6,237,928 B1 | 5/2001 | Islas | |
| 6,336,646 B1 | 1/2002 | Bernardini | |
| 6,588,784 B1 | 7/2003 | Chen | |
| 6,723,029 B2 | 4/2004 | Salgado | |
| 6,733,411 B1 * | 5/2004 | Kaplan et al. | 475/88 |
| 6,779,807 B2 | 8/2004 | Huret | |
| 7,487,987 B2 | 2/2009 | Yan | |
| 7,559,869 B2 * | 7/2009 | Seok | 475/235 |
| 7,607,370 B2 | 10/2009 | Day et al. | |
| 7,644,944 B2 * | 1/2010 | Nicolai | 280/257 |
| 7,717,448 B2 | 5/2010 | Clemons et al. | |
| 7,823,898 B2 * | 11/2010 | Hartmann | 280/253 |
| 8,505,404 B2 * | 8/2013 | Takada et al. | 74/404 |
| 8,511,204 B2 * | 8/2013 | Harju | 74/665 A |
| 8,702,115 B2 * | 4/2014 | Kramer et al. | 280/252 |
| 2004/0162178 A1 * | 8/2004 | Krzesicki et al. | 475/230 |
| 2004/0185982 A1 * | 9/2004 | Yamazaki et al. | 475/230 |
| 2006/0287155 A1 * | 12/2006 | Nakajima | 475/230 |
| 2007/0173368 A1 * | 7/2007 | Takada | 475/230 |
| 2007/0270274 A1 * | 11/2007 | Wu | 475/230 |
| 2011/0183805 A1 * | 7/2011 | Chan | 475/254 |
| 2012/0165150 A1 * | 6/2012 | Chan | 475/8 |
| 2013/0116080 A1 * | 5/2013 | Yoshimura | 475/230 |

* cited by examiner

COMPACT DRIVE MECHANISM WITH SELECTIVE REVERSE POWER OUTPUT

The present invention relates generally to drive mechanisms and pertains, more specifically, to a compact gear drive mechanism for effecting a rotary power output in response to a reciprocating input, such as substantially linear arm or leg movements of an operator and, more particularly, to such a compact drive mechanism in which the direction of the rotary power output is selectively reversible.

In a preferred embodiment, the drive mechanism of the present invention enables a human operator to apply input power using reciprocating substantially linear arm motion or leg motion to create an effective rotary power output, and selectively to effect reversals in the direction of rotation of the rotary power output, without changing the manner in which the reciprocating input is applied. A myriad of devices, equipment and apparatus which require a rotary power input are improved by the incorporation of the present drive mechanism to allow a human operator to use arms or legs moved along substantially linear paths to apply, with greater ease, comfort and effectiveness, forces to be converted by the drive mechanism into a rotational output well suited to the provision of a requisite rotary power output.

Examples of such devices, equipment and apparatus are as follows: Wheeled vehicles such as bicycles, tricycles and carts in which substantially linear leg movements of an operator are used to create a rotational output for driving at least one drive wheel of the vehicle; boat propulsion systems in which substantially linear arm or leg movements of an operator create a rotational power output to at least one propeller of the propulsion system; exercise equipment and machines in which substantially linear arm or leg movements drive at least one rotating resistance member; lifts, hoists, winches and windlasses in which a power input from substantially linear arm movements provide rotational power for rotating a drum or pulley system. In addition, the present gear drive mechanism is adapted readily to a very wide variety of industrial uses where substantially linear movements of a worker's arms or legs can be converted effectively to provide a rotary power output. The present invention enables selection of the direction of rotation of the rotary power output, without requiring a change in the manner in which the essentially linear input is applied.

A compact drive mechanism constructed in accordance with the present invention provides a unique drive system in which reciprocating cranks are coupled to a driven output shaft through a drive system that incorporates all of the recognized advantages of reciprocating crank arrangements while attaining highly desirable additional objects and advantages not heretofore made available in a drive system. Among these objects and advantages are: Increased effectiveness and greater simplicity of construction in a drive mechanism that converts reciprocating substantially linear input forces to a rotary power output having a direction of rotation that is selectively reversed without requiring a change in the manner in which the essentially linear input forces are applied; provides a compact construction for increased versatility and widespread use in a myriad of applications; reduces any possible loss of effectiveness while converting reciprocating substantially linear input forces into a continuous rotary power output selectively directed in either one of opposite directions of rotation; provides increased ease of operation and higher efficiency through a more uniform application of a driving force by an operator of the mechanism; enables ready adjustment for different performance objectives; exhibits smooth and quiet operation; reduces wear of component parts of a drive system; provides more resistance to dust, debris and other foreign matter encountered in the field; reduces requirements for periodic maintenance and repair; enables increased longevity for exemplary performance over an extended service life.

The above objects and advantages, as well as further objects and advantages, are attained by the present invention, which may be described briefly as a drive mechanism for effecting a rotary power output in a selected one of opposite first and second power output directions in response to a reciprocating power input resulting from essentially same-directed substantially linear forces applied to the drive mechanism, the drive mechanism comprising: a first input drive arrangement mounted for rotation in each one of opposite first and second input directions of rotation about a first input axis of rotation, the first input drive arrangement being rotatable in the first input direction of rotation in response to a first substantially linear force applied to the first input drive arrangement; a second input drive arrangement mounted for rotation in each one of opposite first and second input directions of rotation about a second input axis of rotation, the second input drive arrangement being rotatable in the first input direction of rotation in response to a second substantially linear force applied to the second input drive arrangement; a first output drive arrangement mounted for rotation about a first output axis of rotation, the first output drive arrangement being coupled with the first input drive arrangement for rotation of the first output drive arrangement in a first output direction of rotation in response to rotation of the first input drive arrangement in the first input direction of rotation, and being coupled with the second input drive arrangement for rotation of the first output drive arrangement about the first output axis of rotation in a second output direction of rotation, opposite to the first output direction of rotation, in response rotation of the second input drive arrangement in the first input direction of rotation; a second output drive arrangement mounted for rotation about a second output axis of rotation, the second output drive arrangement being coupled with the second input drive arrangement for rotation of the second output drive arrangement about the second output axis of rotation in the first output direction of rotation in response to rotation of the second input drive arrangement in the first input direction of rotation, and being coupled with the first input drive arrangement for rotation of the second output drive arrangement about the second output axis of rotation in the second output direction of rotation, opposite to the first output direction of rotation, in response to rotation of the first input drive arrangement in the first input direction of rotation; a power output shaft mounted for rotation in either one of the first and second power output directions about a power output axis of rotation; a clutch arrangement for actuation between a first condition wherein the first output drive arrangement is coupled with the power output shaft for effecting rotation of the power output shaft in the first power output direction in response to rotation of the first input drive arrangement in the first input direction of rotation, while enabling rotation of the first input drive arrangement in the second input direction of rotation independent of rotation of the power output shaft, and the second output drive arrangement is coupled with the power output shaft for effecting rotation of the power output shaft in the first power output direction in response to rotation of the second input drive arrangement in the first direction of rotation, while enabling rotation of the second input drive arrangement in the second input direction of rotation independent of rotation of the power output shaft, and a second condition wherein the second output drive arrangement is coupled with the power output shaft for effecting rotation of the power output shaft in the second power output direction in response to rotation of the first input drive arrangement in the first input direction of rotation, while enabling rotation of the first input drive arrangement in the second input direction of rotation independent of rotation of the power output shaft, and the first output drive arrangement is coupled with the power output shaft for effecting rotation of the power output shaft in the second power output direction in response to rotation of the second input drive arrangement in the first input direction of rotation, while enabling rotation of the second input drive arrangement in the second input direction of rotation independent of rotation of the power output shaft; and a selector mechanism coupled with the clutch arrangement for actuating the clutch arrangement selectively into one of the first and second conditions; whereby the first and second substantially linear forces applied to the drive mechanism in the same manner enable a rotary power output in either selected one of the first and second power output directions at the power output shaft.

The invention will be understood more fully, while still further objects and advantages will become apparent, in the following detailed description of preferred embodiments of the invention illustrated in the accompanying drawing, in which.

Figure 1:
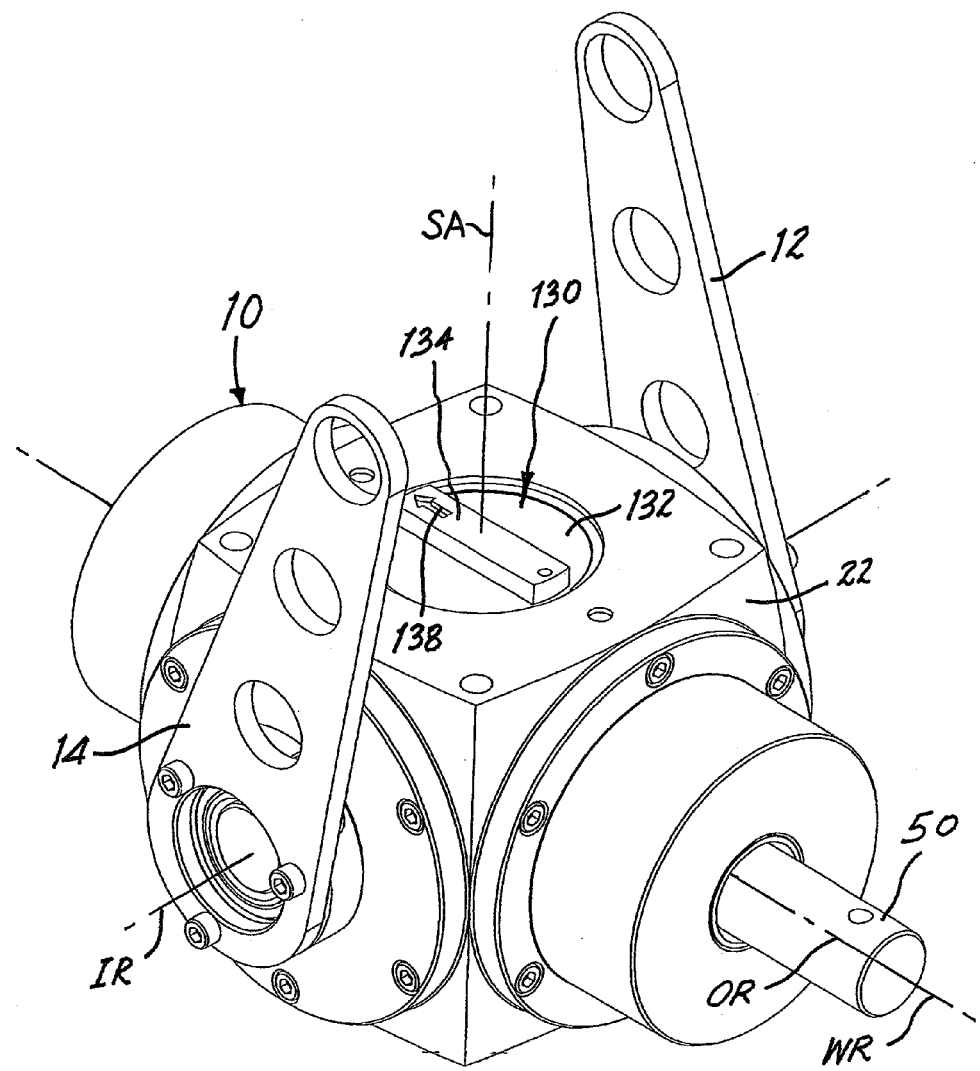
FIG. 1 is a pictorial view of a drive mechanism constructed in accordance with the present invention.
Figure 2:
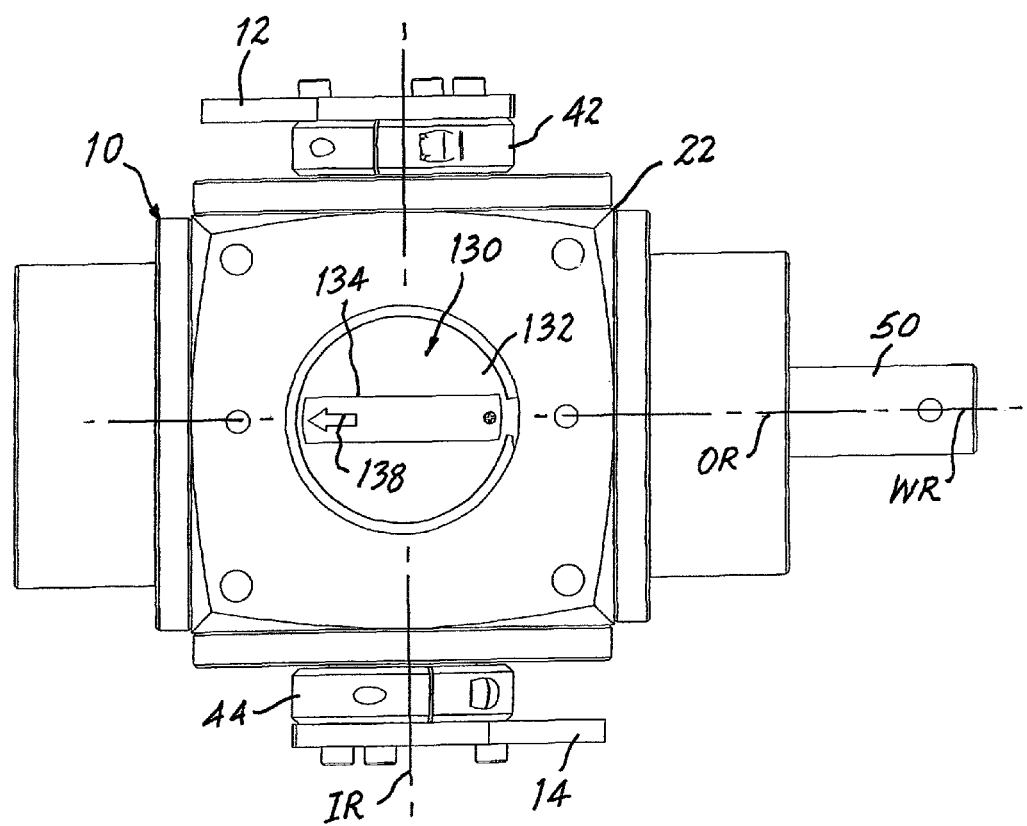
FIG. 2 is a top plan view of the drive mechanism.
Figure 3:
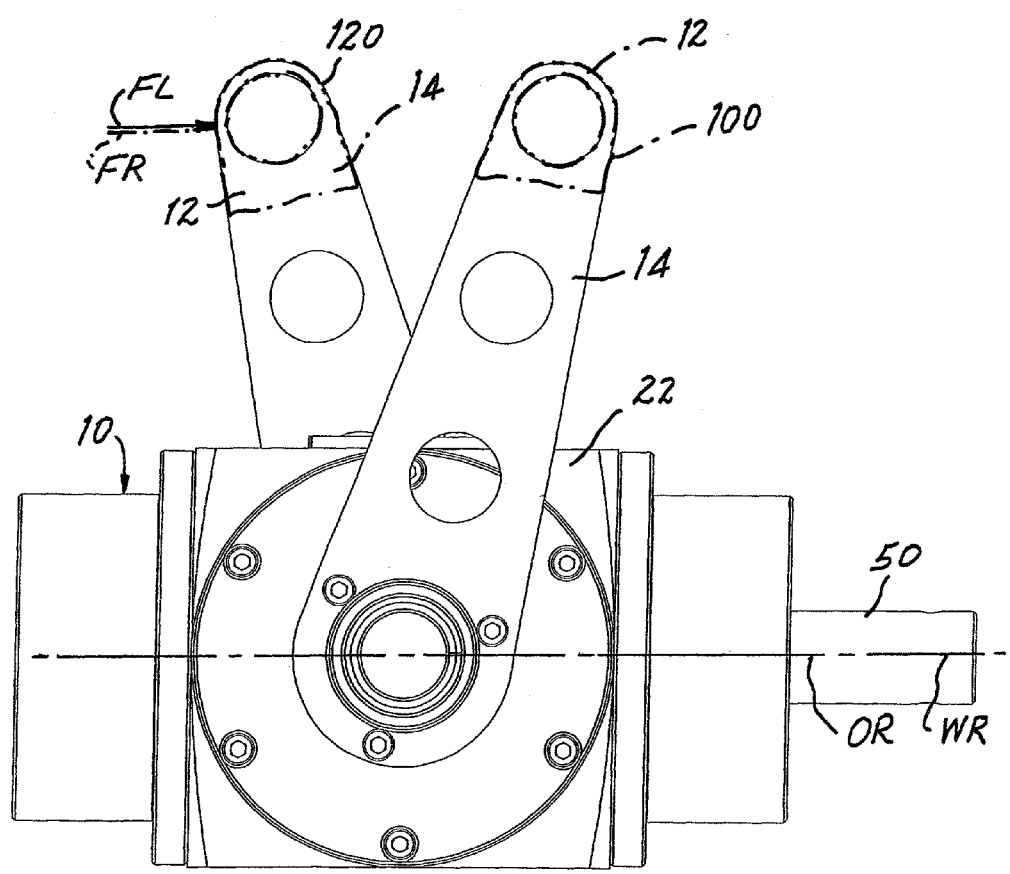
FIG. 3 is a side elevational view, partially diagrammatic, of the drive mechanism.
Figure 4:
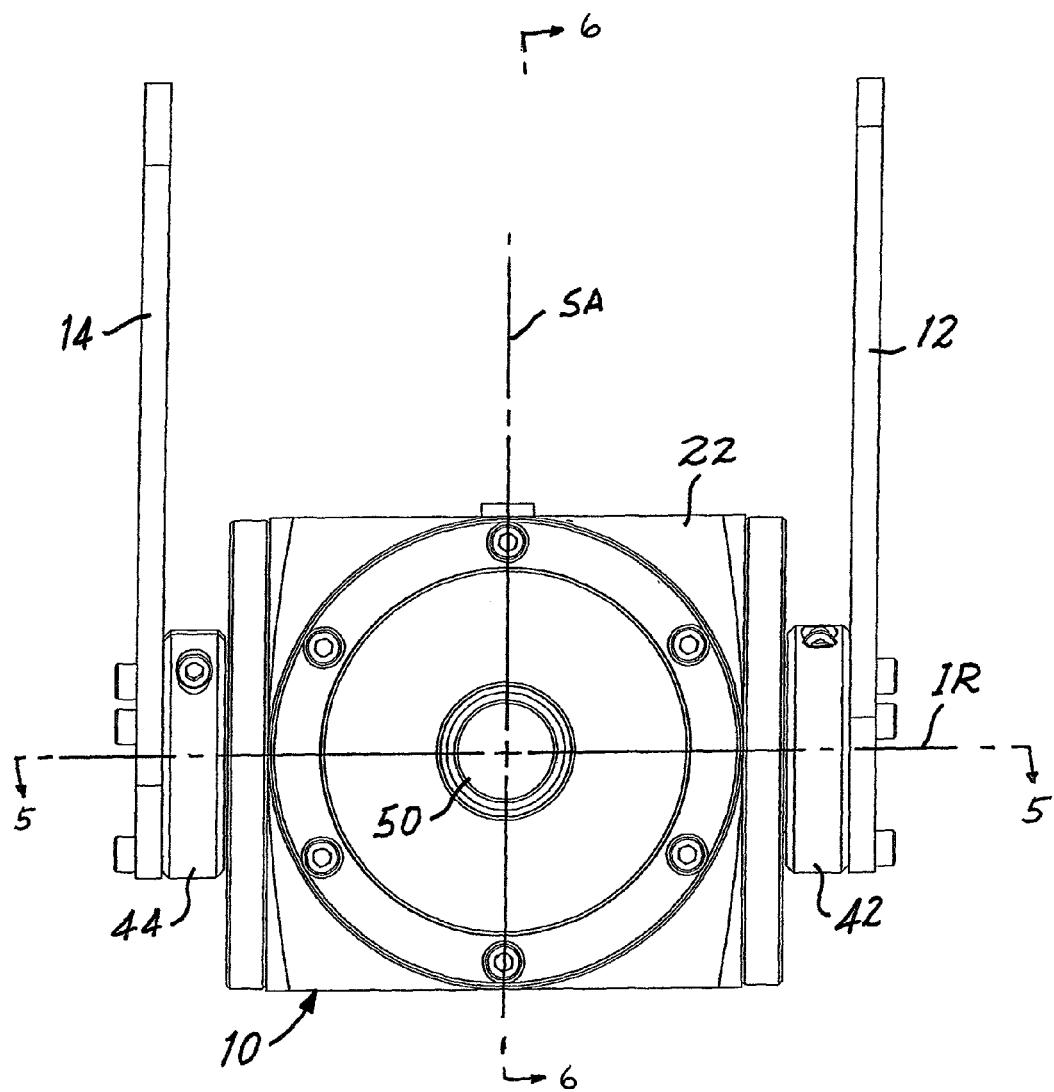
FIG. 4 is a front elevational view of the drive mechanism.

Referring now to the drawing, and especially to FIG. 1 thereof, a compact drive mechanism constructed in accordance with the present invention is shown at 10 and carries opposite crank arms in the form of a left crank arm 12 and a right crank arm 14, both crank arms 12 and 14 being mounted for rotation about a common axis of rotation IR.

Figure 5:
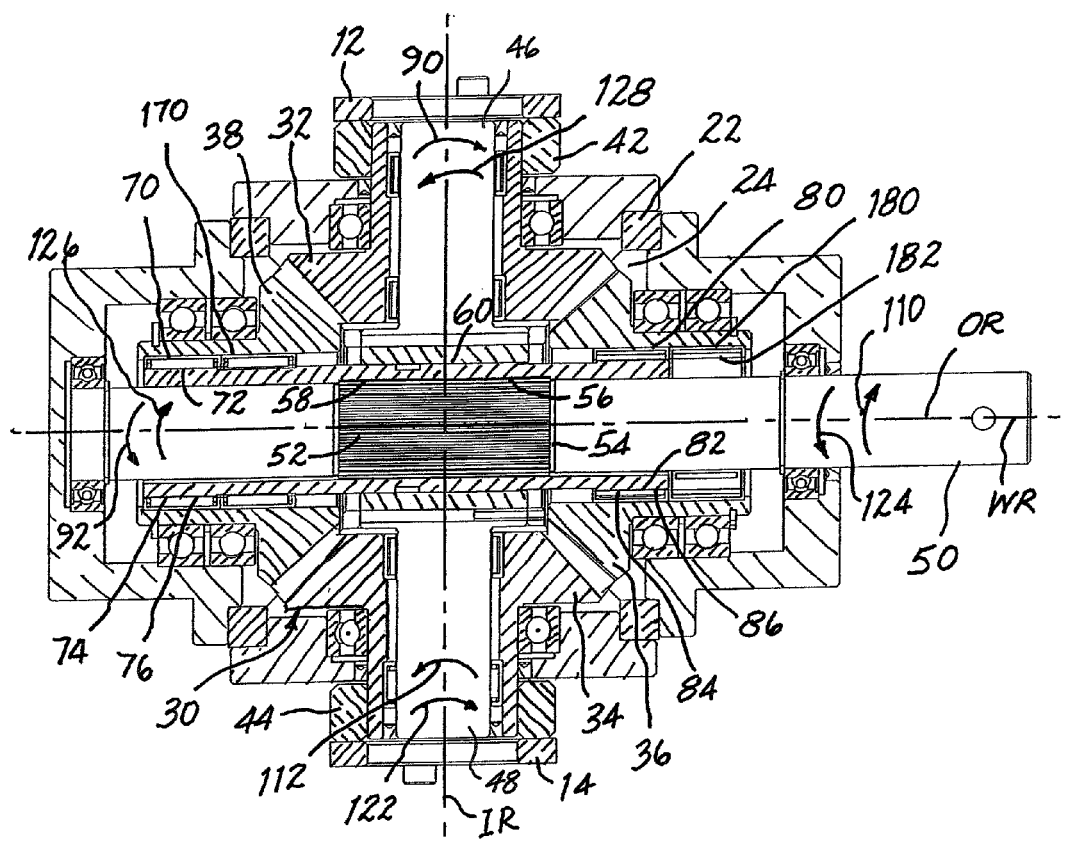
FIG. 5 is a cross-sectional view taken along line 5-5 of FIG. 4.

Turning now to FIGS. 2 through 6, as well as with reference to FIG. 1, drive mechanism 10 includes a casing in the form of a gear box 22 which seals the interior 24 of the gear box 22 against the entry of foreign matter encountered outside the gear box 22 while maintaining a gear train 30 within the interior 24, in working arrangement and protected against outside elements. Gear train 30 is comprised of four bevel gears, including a left-input drive gear 32 of a first input drive arrangement, a right-input drive gear 34 of a second input drive arrangement, a forward drive gear 36 of a first output drive arrangement, and a rearward drive gear 38 of a second output drive arrangement, all of which gears are meshed in an orthogonal, box-like arrangement, as seen in FIG. 5. The left-input drive gear 32 is connected to the left crank arm 12 through a left collar 42, secured to both the left crank arm 12 and the left-input drive gear 32, and the right-input drive gear 34 is connected to the right crank arm 14 through a right collar 44 secured to both the right crank arm 14 and the right-input drive gear 34. The drive gears 32 and 34 are journaled for rotation on respective stationary stub shafts 46 and 48 for rotation about the common input axis of rotation IR, while both drive gears 36 and 38 are journaled for rotation about a common output axis of rotation OR.

Figure 6:
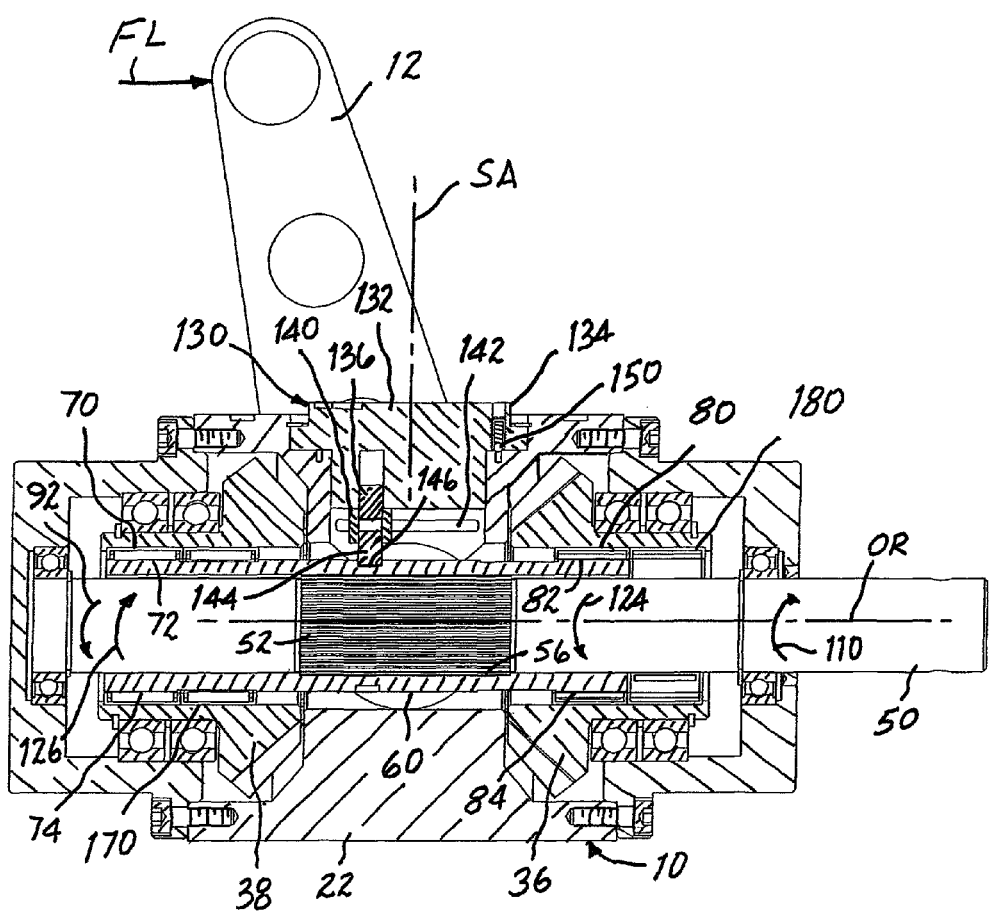
FIG. 6 is a cross-sectional view taken along line 6-6 of FIG. 4.

The forward drive gear 36 and the rearward drive gear 38 are coupled with a power output shaft 50, as follows: As seen in FIGS. 5 and 6, an external splined section 52 extends along external surface 54 of power output shaft 50 and is engaged with a complementary internal splined section 56 extending along internal surface 58 of a coupler in the form of a sleeve 60 in sliding engagement coaxial with power output shaft 50, along the engaged splined sections 52 and 56. The engaged splined sections 52 and 56 also couple the power output shaft 50 for rotation with the sleeve 60, while enabling sliding movement of the sleeve 60 along the power output shaft 50 and axis OR, as will be described below.

A clutch arrangement includes a first clutch set having a first one-way clutch 70 affixed to the rearward drive gear 38 and coupling the rearward drive gear 38 with sleeve 60 by means of an internal splined section 72 on clutch 70, shown in FIGS. 5 and 6 engaged with an external splined section 74 extending along an outer surface portion 76 of sleeve 60. A second one-way clutch 80 is affixed to the forward drive gear 36 and couples the forward drive gear 36 with sleeve 60 by means of an internal splined section 82 on clutch 80, shown engaged with an external splined section 84 extending along an outer surface portion 86 of sleeve 60. Thus, in the illustrated compact orthogonal arrangement, the input axis of rotation IR is substantially perpendicular to output axis of rotation OR, and the output axis of rotation OR is coextensive with a power output axis of rotation WR.

Upon the application of a substantially linear force FL to left crank arm 12, movement of the left crank arm 12 will rotate left-input drive gear 32 in the direction of arrow 90 which, in turn, will rotate the rearward drive gear 38 in the direction of arrow 92. Clutch 70 is arranged to couple rearward drive gear 38 with power output shaft 50, through the splined engagements between splined sections 72 and 74, and between splined sections 52 and 54, so that upon rotation of rearward drive gear 38 in the direction of arrow 92, power will be transmitted from the left-input drive gear 32 to the rearward drive gear 38, and then, through sleeve 60, to power output shaft 50 which also is rotated in the direction of arrow 92, as the left crank arm 12 is moved by force FL from a retracted position, shown in full lines, to an advanced position, depicted in a superposed phantom image at 100, in FIG. 3.

At the same time, the forward drive gear 36 will be rotated by the left-input gear 32 in the direction of arrow 110, clutch 80 being arranged to uncouple forward drive gear 36 from sleeve 60 and thereby allow free rotation of forward drive gear 36 relative to and independent of sleeve 60 and power output shaft 50, in the direction of arrow 110. Rotation of rearward drive gear 38 in the direction of arrow 92, and rotation of forward drive gear 36 in the direction of arrow 110, will effect rotation of right-input drive gear 34 in the direction of arrow 112, consequently rotating right crank arm 14 to retract the right crank arm 14 from the advanced position, shown in full lines, to a retracted position depicted in a superposed phantom image at 120, in FIG. 3.

With the right crank arm 14 now at the retracted position 120, and the left crank arm 12 at the advanced position 100, an operator (not shown) can apply a substantially linear force FR to the right crank arm 14, to move the right crank arm 14 toward the advanced position and rotate the right-input drive gear 34 in the direction of arrow 122. In turn, the forward drive gear 36 will be rotated in the direction of arrow 124.

Clutch 80 is arranged to couple forward drive gear 36 with sleeve 60 upon rotation of forward drive gear 36 in the direction of arrow 124, so that power is transmitted from the right-input drive gear 34 to the forward drive gear 36, and then, through sleeve 60, to power output shaft 50 which also is rotated in the direction of arrow 124, which is the same direction as indicated by arrow 92, as the right crank arm 14 is moved from the retracted position 120 toward an advanced position.

At the same time, the rearward drive gear 38 will be rotated by the right-input drive gear 34 in the direction of arrow 126, clutch 70 being arranged to uncouple rearward drive gear 38 from sleeve 60 and thereby allow free rotation of rearward drive gear 38 relative to and independent of sleeve 60 and power output shaft 50, in the direction of arrow 126. Rotation of forward drive gear 36 in the direction of arrow 124, and rotation of rearward drive gear 38 in the direction of arrow 126, will effect rotation of left-input drive gear 32 in the direction of arrow 128, consequently rotating left crank arm 12 to retract the left crank arm 12 from the advanced position 100 toward the retracted position, thereby completing a full cycle of operation in which power output shaft 50 is rotated about power output axis of rotation WR in the direction of arrow 92.

Figure 7:
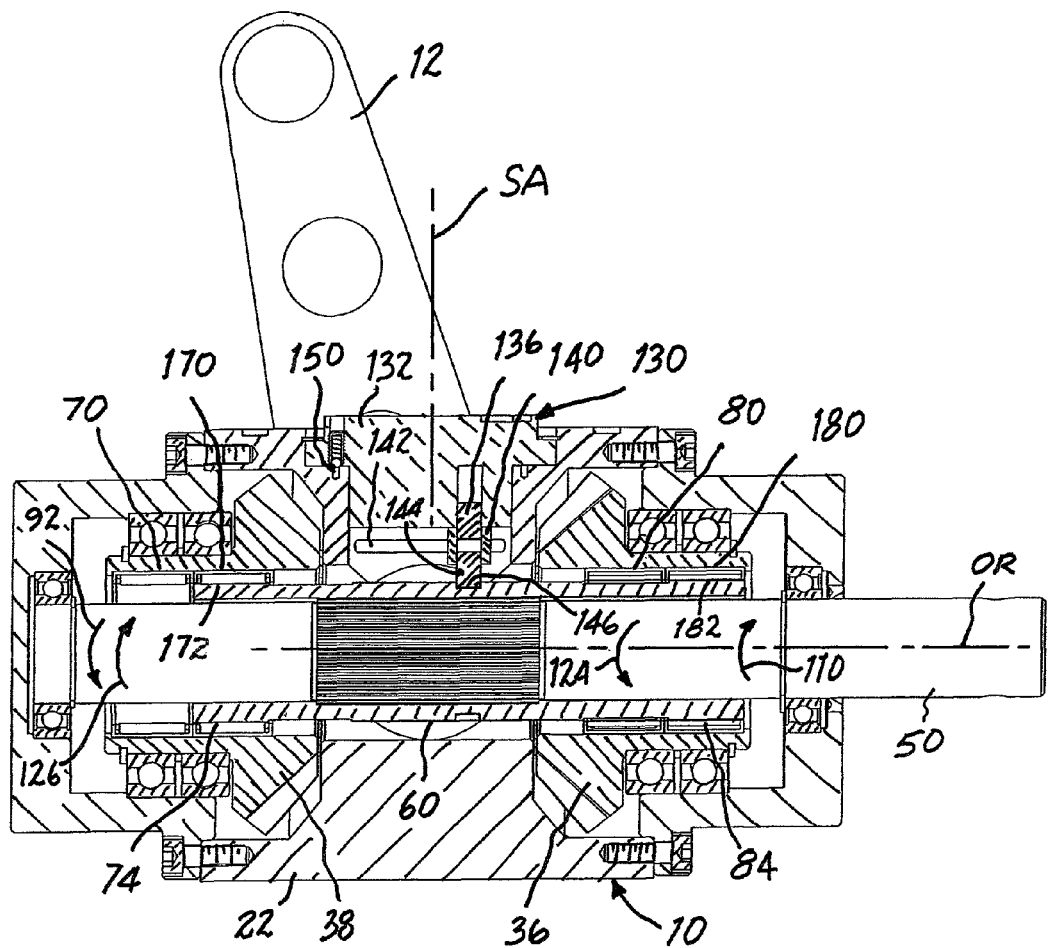
FIG. 7 is a cross-sectional view similar to FIG. 6 and showing component parts in another operating position.
Figure 8:
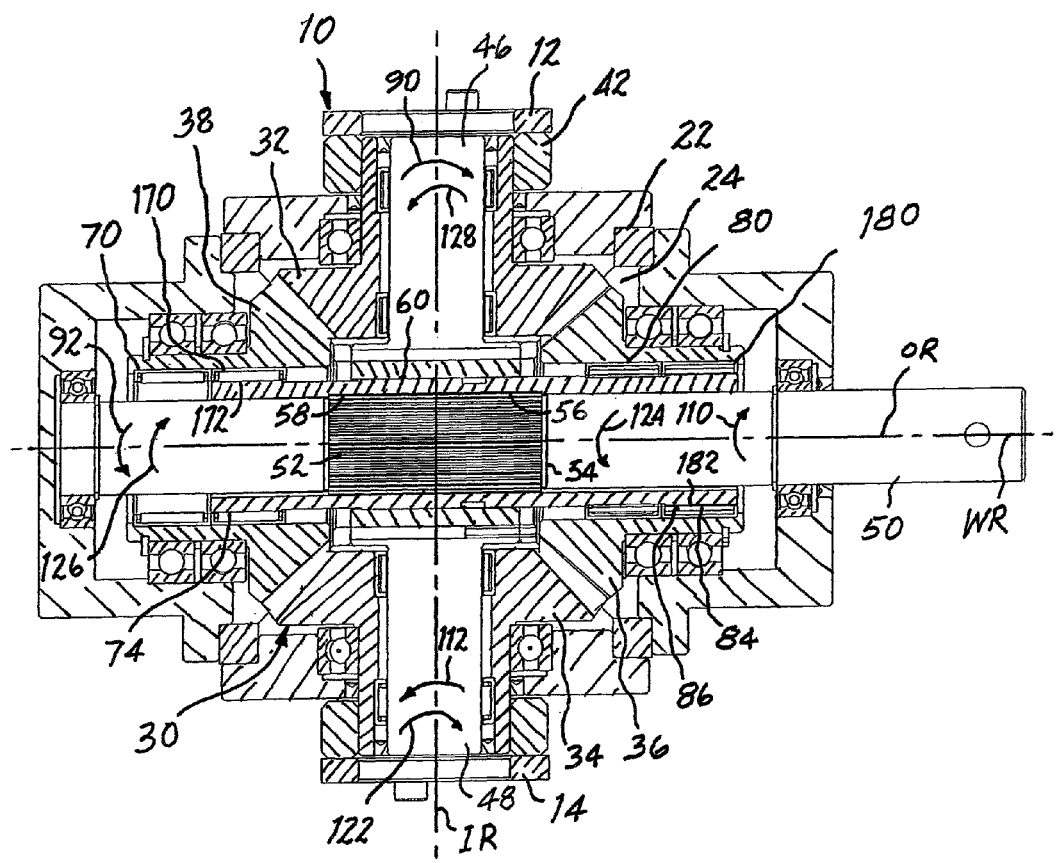
FIG. 8 is a cross-sectional view similar to FIG. 5 and showing component parts in the position illustrated in FIG. 7.
Figure 9:
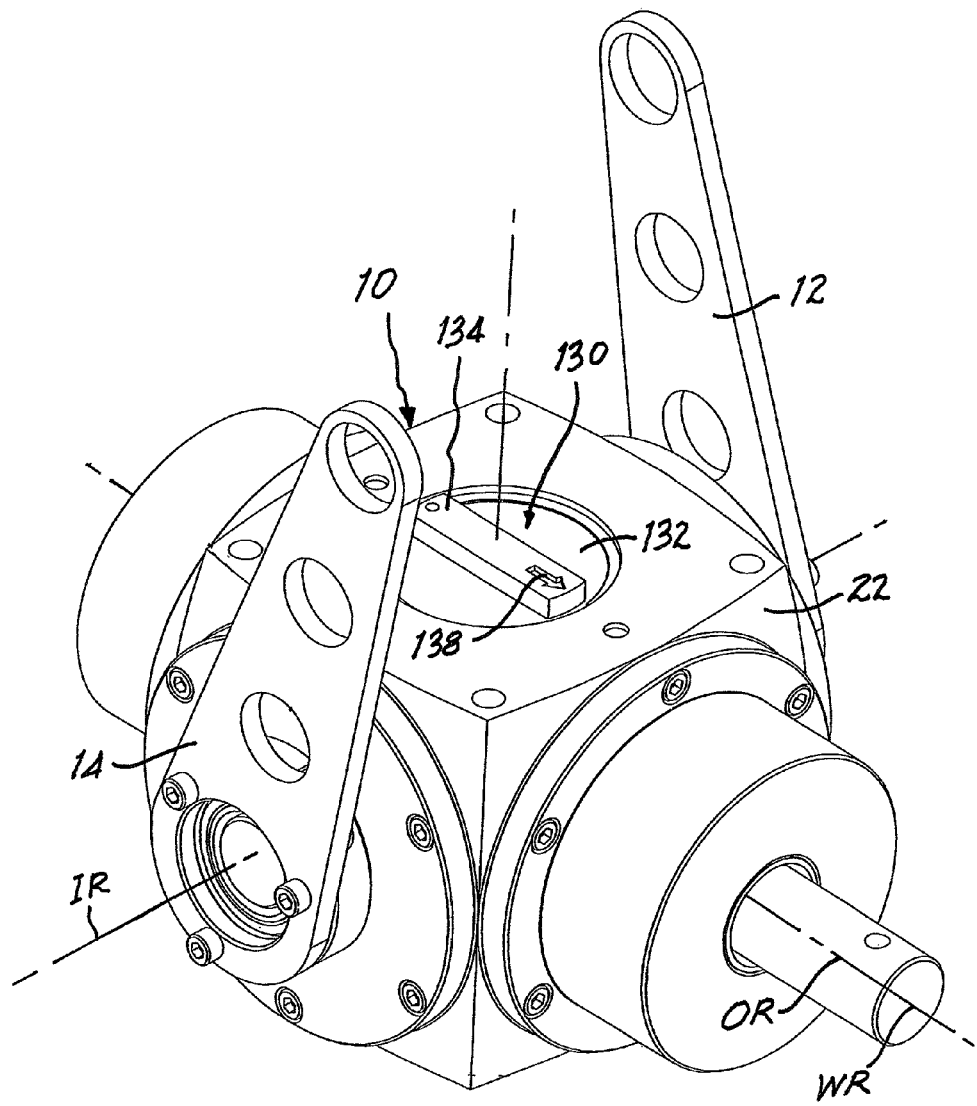
FIG. 9 is a pictorial view similar to FIG. 1, and showing component parts in the operating position as depicted in FIGS. 7 and 8.

With reference now to FIGS. 7 through 9, when desired, the direction of rotation of power output shaft 50 can be reversed, selectively, without requiring a change in the manner in which the essentially linear forces FL and FR are applied to the drive mechanism 10. To that end, a selector mechanism 130 is coupled with the clutch arrangement and is seen to include an actuator in the form of a selector dial 132 mounted for rotation within gear box 22 about an axis SA extending orthogonal to axes IR and OR and accessible, for selective rotation, at the top of gear box 22 where a finger grip 134 is provided for facilitating the selective rotation of dial 132 between the position illustrate in FIG. 1 and the position shown in FIG. 9. A drive pin 136 is carried by dial 132 and projects into a yoke 140 which is mounted for linear sliding movement substantially parallel to axis OR, within diametrically opposed slots, one of which slots is illustrated at 142, between a first position, illustrated in FIG. 6, and a second position, shown in FIG. 7, in response to rotation of dial 132 through a displacement of 180° to index the selector mechanism 130 into one of the two orientations depicted in FIGS. 1 and 9, corresponding to one of the two positions of yoke 140 shown respectively in FIGS. 6 and 7. A driven pin 144 is carried by yoke 140 and engages a circumferential groove 146 in sleeve 60 such that upon rotation of dial 132 and concomitant linear movement of yoke 140 and drive pin 136, driven pin 144 will move sleeve 60 between the position illustrated in FIG. 6 and the position illustrated in FIG. 7. A detent 150 maintains the dial 132 in either one of the positions shown in FIGS. 1 and 9 and, accordingly, the sleeve 60, in either selected one of the two positions shown in FIGS. 6 and 7.

As described above, when the sleeve 60 is in the position illustrated in FIG. 6, the clutch arrangement is in a first condition wherein the clutches 70 and 80 of the first clutch set operate in concert to enable rotation of the power output shaft 50 in the direction of arrow 92, in response to the substantially linear forces FL and FR applied, respectively, and alternately, to the left and right crank arms 12 and 14. When the dial 132 is rotated through 180°, to the position shown in FIGS. 7 through 9, sleeve 60 is moved along power output shaft 50 to be placed in the position illustrated in FIGS. 7 and 8, thereby disengaging the splined sections 74 and 84 of sleeve 60 respectively from the splined sections 72 and 82 of clutches 70 and 80. The clutch arrangement includes a second clutch set having a third one-way clutch 170 affixed to the rearward drive gear 38 and including a spline section 172, and a fourth one-way clutch 180 affixed to the forward drive gear 36 and including a spline section 182. Upon movement of the sleeve 60 into the position illustrated in FIGS. 7 and 8, the clutch arrangement is actuated into a second condition wherein splined sections 74 and 84 of sleeve 60 are engaged respectively with splined sections 172 and 182 of the third and fourth clutches 170 and 180.

Now, upon the application of a substantially linear force FL to left crank arm 12, movement of the left crank arm 12 will rotate left-input drive gear 32 in the direction of arrow 90 which, in turn, will rotate the forward drive gear 38 in the direction of arrow 110. However, clutch 180 is arranged to couple forward drive gear 36 with power output shaft 50, through the splined engagements between splined sections 182 and 84, and between splined sections 52 and 54, so that upon rotation of forward drive gear 36 in the direction of arrow 110, power will be transmitted from the left-input drive gear 32 to the forward drive gear 36, and then, through sleeve 60, to power output shaft 50 which also is rotated in the direction of arrow 110, as the left crank arm 12 is moved by force FL to the advanced position, depicted in phantom at 100 in FIG. 3. Thus, when the dial 132 is in the selected position shown in FIG. 9, rotation of the power output shaft 50 is in the direction of arrow 110, opposite to the direction of rotation as depicted by arrow 92.

At the same time, the rearward drive gear 38 will be rotated by the left-input drive gear 32 in the direction of arrow 92, clutch 170 being arranged to uncouple rearward drive gear 38 from sleeve 60 and thereby allow free rotation of rearward drive gear 38 relative to and independent of sleeve 60 and power output shaft 50, in the direction of arrow 92. Rotation of forward drive gear 36 in the direction of arrow 110, and rotation of rearward drive gear 38 in the direction of arrow 92, will effect rotation of right-input drive gear 34 in the direction of arrow 112, consequently rotating right crank arm 14 to retract the right crank arm 14 toward the retracted position, depicted in phantom at 120 in FIG. 3.

With the right crank arm 14 now at the retracted position 120, and the left crank arm 12 at the advanced position 100, an operator (not shown) can apply a substantially linear force FR to the right crank arm 14 to move the right crank arm 14 toward the advanced position and rotate the right-input drive gear 34 in the direction of arrow 122. In turn, the rearward drive gear 38 will be rotated in the direction of arrow 126. Clutch 170 is arranged to couple rearward drive gear 38 with sleeve 60 upon rotation of rearward drive gear 38 in the direction of arrow 126, so that power will be transmitted from the right-input drive gear 34 to the rearward drive gear 38, and then through sleeve 60 to power output shaft 50 which also will be rotated in the direction of arrow 126, as the right crank arm 14 is moved from the retracted position 120 toward the advanced position shown in full lines in FIG. 3. At the same time, the forward drive gear 36 will be rotated by the right-input gear 34 in the direction of arrow 110, clutch 180 being arranged to uncouple forward drive gear 36 from sleeve 60 and thereby allow free rotation of forward drive gear 36 relative to and independent of sleeve 60 and power output shaft 50, in the direction of arrow 124. Rotation of rearward drive gear 38 in the direction of arrow 126, and rotation of forward drive gear 36 in the direction of arrow 124, will effect rotation of left-input drive gear 32 in the direction of arrow 128, consequently rotating left crank arm 12 to retract the left crank arm 12 from the advanced position 100 toward the retracted position shown in full lines in FIG. 3, thereby completing a full cycle of operation in which the power output shaft 50 is rotated about power output axis of rotation WR in the direction of arrow 110, opposite to the aforesaid direction of rotation depicted by arrow 92. Thus, merely by operating selector mechanism 130, the clutch arrangement is actuated into either one of the first and second conditions described above, enabling selection of the direction of the rotary power output at power output shaft 50 without requiring a change in the manner in which the substantially linear forces FL and FR are applied to the drive mechanism 10.

Drive system 10 is compact, easily adjusted to the particular requirements of an application, and is integrated readily into a wide variety of applications. Internal gearing for gear drive 30 may be selected from any one of variety of available conventional internal gearing drives, enabling increased versatility. The sealed gear box 22 resists infiltration of dust, debris or other foreign matter which could cause deleterious effects such as diminished performance and premature wear, while reducing the requirement for frequent periodic maintenance and repair. Moreover, operation is quiet and smooth.

It will be apparent that drive mechanism 10 has applications in many settings that require a drive arrangement in which a reciprocating power input is coupled to a rotating power output shaft. Depending upon the requirements of a particular setting, drive mechanism 10 can be provided with suitable operating members, such as pedals, handgrips or the like. Thus, as noted in the examples set forth above, drive mechanism 10 can find use in propulsion systems for vehicles, including multiple wheeled vehicles such as bicycles, tricycles and carts and propeller drives for boats. In addition, drive mechanism 10 can be adapted to exercise machines and equipment, lifts, hoists, winches, windlasses and like devices, as well as to a wide variety of industrial uses where substantially linear reciprocating movements of an operator's arms or legs are converted to rotational movement of a power output shaft.

It will be seen that the present invention attains all of the objects and advantages outlined above, namely: Increased effectiveness and greater simplicity of construction in a drive mechanism that converts reciprocating substantially linear input forces to a rotary power output having a direction of rotation that is selectively reversed without requiring a change in the manner in which the essentially linear input forces are applied; provides a compact construction for increased versatility and widespread use in a myriad of applications; reduces any possible loss of effectiveness while converting reciprocating substantially linear input forces into a continuous rotary power output selectively directed in either one of opposite directions of rotation; provides increased ease of operation and higher efficiency through a more uniform application of a driving force by an operator of the mechanism; enables ready adjustment for different performance objectives; exhibits smooth and quiet operation; reduces wear of component parts of a drive system; provides more resistance to dust, debris and other foreign matter encountered in the field; reduces requirements for periodic maintenance and repair; enables increased longevity for exemplary performance over an extended service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A drive mechanism for effecting a rotary power output in a selected one of opposite first and second power output directions in response to a reciprocating power input resulting from essentially same-directed substantially linear forces applied to the drive mechanism, the drive mechanism comprising:

a first input drive arrangement mounted for rotation in each one of opposite first and second input directions of rotation about a first input axis of rotation, the first input drive arrangement being rotatable in the first input direction of rotation in response to a first substantially linear force applied to the first input drive arrangement;

a second input drive arrangement mounted for rotation in each one of opposite first and second input directions of rotation about a second input axis of rotation, the second input drive arrangement being rotatable in the first input direction of rotation in response to a second substantially linear force applied to the second input drive arrangement;

a first output drive arrangement mounted for rotation about a first output axis of rotation, the first output drive arrangement being coupled with the first input drive arrangement for rotation of the first output drive arrangement in a first output direction of rotation in response to rotation of the first input drive arrangement in the first input direction of rotation, and being coupled with the second input drive arrangement for rotation of the first output drive arrangement about the first output axis of rotation in a second output direction of rotation, opposite to the first output direction of rotation, in response rotation of the second input drive arrangement in the first input direction of rotation;

a second output drive arrangement mounted for rotation about a second output axis of rotation, the second output drive arrangement being coupled with the second input drive arrangement for rotation of the second output drive arrangement about the second output axis of rotation in the first output direction of rotation in response to rotation of the second input drive arrangement in the first input direction of rotation, and being coupled with the first input drive arrangement for rotation of the second output drive arrangement about the second output axis of rotation in the second output direction of rotation, opposite to the first output direction of rotation, in response to rotation of the first input drive arrangement in the first input direction of rotation;

a power output shaft mounted for rotation in either one of the first and second power output directions about a power output axis of rotation;

a clutch arrangement for actuation between a first condition wherein the first output drive arrangement is coupled with the power output shaft for effecting rotation of the power output shaft in the first power output direction in response to rotation of the first input drive arrangement in the first input direction of rotation, while enabling rotation of the first input drive arrangement in the second input direction of rotation independent of rotation of the power output shaft, and the second output drive arrangement is coupled with the power output shaft for effecting rotation of the power output shaft in the first power output direction in response to rotation of the second input drive arrangement in the first direction of rotation, while enabling rotation of the second input drive arrangement in the second input direction of rotation independent of rotation of the power output shaft, and a second condition wherein the second output drive arrangement is coupled with the power output shaft for effecting rotation of the power output shaft in the second power output direction in response to rotation of the first input drive arrangement in the first input direction of rotation, while enabling rotation of the first input drive arrangement in the second input direction of rotation independent of rotation of the power output shaft, and the first output drive arrangement is coupled with the power output shaft for effecting rotation of the power output shaft in the second power output direction in response to rotation of the second input drive arrangement in the first input direction of rotation, while enabling rotation of the second input drive arrangement in the second input direction of rotation independent of rotation of the power output shaft; and a selector mechanism coupled with the clutch arrangement for actuating the clutch arrangement selectively into one of the first and second conditions;

whereby the first and second substantially linear forces applied to the drive mechanism in the same manner enable a rotary power output in either selected one of the first and second power output directions at the power output shaft.

2. The drive mechanism of claim 1 wherein the first output axis of rotation is coextensive with the power output axis of rotation.

3. The drive mechanism of claim 1 wherein the second output axis of rotation is coextensive with the power output axis of rotation.

4. The drive mechanism of claim 1 wherein each of the first and second output axes of rotation is coextensive with the power output axis of rotation.

5. The drive mechanism of claim 1 wherein:

the second output drive arrangement is coupled with the first input drive arrangement for rotation of the first input drive arrangement in the second direction of rotation about the first input axis of rotation in response to rotation of the second input drive arrangement in the first direction of rotation about the second input axis of rotation; and the first output drive arrangement is coupled with the second input drive arrangement for rotation of the second input drive arrangement in the second direction of rotation about the second input axis of rotation in response to rotation of the first input drive arrangement in the first direction of rotation about the first input axis of rotation.

6. The drive mechanism of claim 5 wherein:

the first input drive arrangement includes a first crank arm mounted for movement between a first position and a second position in response to the first substantially linear force applied to the first input drive arrangement at the first crank arm;

the second input drive arrangement includes a second crank arm mounted for movement between a first position and a second position in response to the second substantially linear force applied to the second input drive arrangement at the second crank arm; and the first and second crank arms are arranged relative to one another such that the second crank arm is moved from the second position thereof to the first position thereof in response to movement of the first crank arm from the first position thereof to the second position thereof, and the first crank arm is moved from the second position thereof to the first position thereof in response to movement of the second crank arm from the first position thereof to the second position thereof.

7. The drive mechanism of claim 1 wherein the first and second input axes of rotation are coextensive.

8. The drive mechanism of claim 1 wherein the clutch arrangement includes:

a first clutch set having a first clutch for coupling the first output drive arrangement with the power output shaft during rotation of the first input drive arrangement in the first direction of rotation about the first input axis of rotation, such that the power output shaft will be rotated in the first power output direction, and for uncoupling the first output drive arrangement from the power output shaft during rotation of the first input drive arrangement in the second direction of rotation about the first input axis of rotation, and a second clutch for coupling the second output drive arrangement with the power output shaft during rotation of the second input drive arrangement in the first direction of rotation about the second input axis of rotation, the power output shaft will be rotated in the first power output direction, and for uncoupling the second output drive arrangement from the power output shaft during rotation of the second input drive arrangement in the second direction of rotation about the second input axis of rotation; and a second clutch set having a third clutch for coupling the first output drive arrangement with the power output shaft during rotation of the first input drive arrangement in the first direction of rotation about the first input axis of rotation, such that the power output shaft will be rotated in the second power output direction, and for uncoupling the first output drive arrangement from the power output shaft during rotation of the first input drive arrangement in the second direction of rotation about the first input axis of rotation, and a fourth clutch for coupling the second output drive arrangement with the power output shaft during rotation of the second input drive arrangement in the first direction of rotation about the second input axis of rotation, the power output shaft will be rotated in the second power output direction, and for uncoupling the second output drive arrangement from the power output shaft during rotation of the second input drive arrangement in the second direction of rotation about the second input axis of rotation; and the selector mechanism includes an actuator for selectively engaging the power output shaft with one of the first and second clutch sets.

9. The drive mechanism of claim 8 wherein the selector mechanism includes a coupler engaged with the power output shaft for rotation with the power output shaft about the power axis of rotation, and movable relative to the power output shaft, in response to the actuator, for engaging the coupler with a selected one of the first and second clutch sets, thereby effecting concomitant engagement of the power output shaft with the selected clutch set.

10. The drive mechanism of claim 9 wherein each of the first, second, third and fourth clutches comprises a one-way clutch.

11. The drive mechanism of claim 1 wherein:

the first input drive arrangement includes a first input drive gear;

the first output drive arrangement includes a first output drive gear meshed with the first input drive gear;

the second input drive arrangement includes a second input drive gear; and the second output drive arrangement includes a second output drive gear meshed with the second input drive gear.

12. The drive mechanism of claim 11 wherein:

the first output drive gear is mounted for rotation about the first output axis of rotation, and the first output axis of rotation is coextensive with the power output axis of rotation;

the first clutch arrangement includes:
a first clutch set having a first clutch for coupling the first output drive gear with the power output shaft during rotation of the first input drive gear in the first direction of rotation about the first input axis of rotation, such that the power output shaft will be rotated in the first power output direction, and for uncoupling the first output drive arrangement from the power output shaft during rotation of the first input drive gear in the second direction of rotation about the first input axis of rotation, and a second clutch for coupling the second output drive gear with the power output shaft during rotation of the second input drive gear in the first direction of rotation about the second input axis of rotation, the power output shaft will be rotated in the first power output direction, and for uncoupling the second output drive gear from the power output shaft during rotation of the second input drive gear in the second direction of rotation about the second input axis of rotation; and
a second clutch set having a third clutch for coupling the first output drive gear with the power output shaft during rotation of the first input drive gear in the first direction of rotation about the first input axis of rotation, such that the power output shaft will be rotated in the second power output direction, and for uncoupling the first output drive gear from the power output shaft during rotation of the first input drive gear in the second direction of rotation about the first input axis of rotation, and a fourth clutch for coupling the second output drive gear with the power output shaft during rotation of the second input drive gear in the first direction of rotation about the second input axis of rotation, the power output shaft will be rotated in the second power output direction, and for uncoupling the second output drive gear from the power output shaft during rotation of the second input drive gear in the second direction of rotation about the second input axis of rotation; and
the selector mechanism includes an actuator for selectively engaging the power output shaft with one of the first and second clutch sets.

13. The drive mechanism of claim 12 wherein:
the first input axis of rotation is coextensive with the second input axis of rotation;
the first and second input axes of rotation are substantially perpendicular to the power output axis of rotation;
the first output axis of rotation is coextensive with the second output axis of rotation, and the first and second output axes of rotation are coextensive with the power output axis of rotation;
each of the first and second input drive gears comprises a bevel gear; and
each of the first and second output drive gears comprises a bevel gear meshed with each of the first and second input drive gears;
whereby the first input drive gear is rotated in the second direction of rotation about the first input axis of rotation in response to rotation of the second input drive gear in the first direction of rotation about the second input axis of rotation, and the second input drive gear is rotated in the second direction of rotation about the second input axis of rotation in response to rotation of the first input drive gear in the first direction of rotation about the first input axis of rotation.

14. The drive mechanism of claim 13 wherein:
the first input drive arrangement includes a first crank arm coupled with the first input drive gear for movement between a first position and a second position in response to the first substantially linear force applied to the first crank are;
the second input drive arrangement includes a second crank arm coupled with the second input drive gear for movement between a first position and a second position in response to the second substantially linear force applied to the second crank arm; and
the first and second crank arms are arranged relative to one another such that the second crank arm is moved from the second position thereof to the first position thereof in response to movement of the first crank arm from the first position thereof to the second position thereof, and the first crank arm is moved from the second position thereof to the first position thereof in response to movement of the second crank arm from the first position thereof to the second position thereof.

15. The drive mechanism of claim 1 wherein the clutch arrangement includes:
a first clutch set having a first clutch for coupling the first output drive arrangement with the power output shaft during rotation of the first input drive arrangement in the first direction of rotation about the first input axis of rotation, such that the power output shaft will be rotated in the first power output direction, and for uncoupling the first output drive arrangement from the power output shaft during rotation of the first input drive arrangement in the second direction of rotation about the first input axis of rotation, and a second clutch for coupling the second output drive arrangement with the power output shaft during rotation of the second input drive arrangement in the first direction of rotation about the second input axis of rotation, the power output shaft will be rotated in the first power output direction, and for uncoupling the second output drive arrangement from the power output shaft during rotation of the second input drive arrangement in the second direction of rotation about the second input axis of rotation; and
a second clutch set having a third clutch for coupling the first output drive arrangement with the power output shaft during rotation of the first input drive arrangement in the first direction of rotation about the first input axis of rotation, such that the power output shaft will be rotated in the second power output direction, and for uncoupling the first output drive arrangement from the power output shaft during rotation of the first input drive arrangement in the second direction of rotation about the first input axis of rotation, and a fourth clutch for coupling the second output drive arrangement with the power output shaft during rotation of the second input drive arrangement in the first direction of rotation about the second input axis of rotation, the power output shaft will be rotated in the second power output direction, and for uncoupling the second output drive arrangement from the power output shaft during rotation of the second input drive arrangement in the second direction of rotation about the second input axis of rotation; and
the selector mechanism includes an actuator for selectively engaging the power output shaft with one of the first and second clutch sets.

16. The drive mechanism of claim 15 wherein the selector mechanism includes a coupler engaged with the power output shaft and movable relative to the power output shaft, in response to the actuator, for engaging the coupler with a selected one of the first and second clutch sets, thereby effecting concomitant engagement of the power output shaft with the selected clutch set.

17. The drive mechanism of claim 16 wherein each of the first, second, third and fourth clutches comprises a one-way clutch.

* * * * *